Nov. 14, 1939.  A. R. LINDBLAD  2,179,892
APPARATUS FOR DETERMINING GRAVITY
Filed Nov. 24, 1937
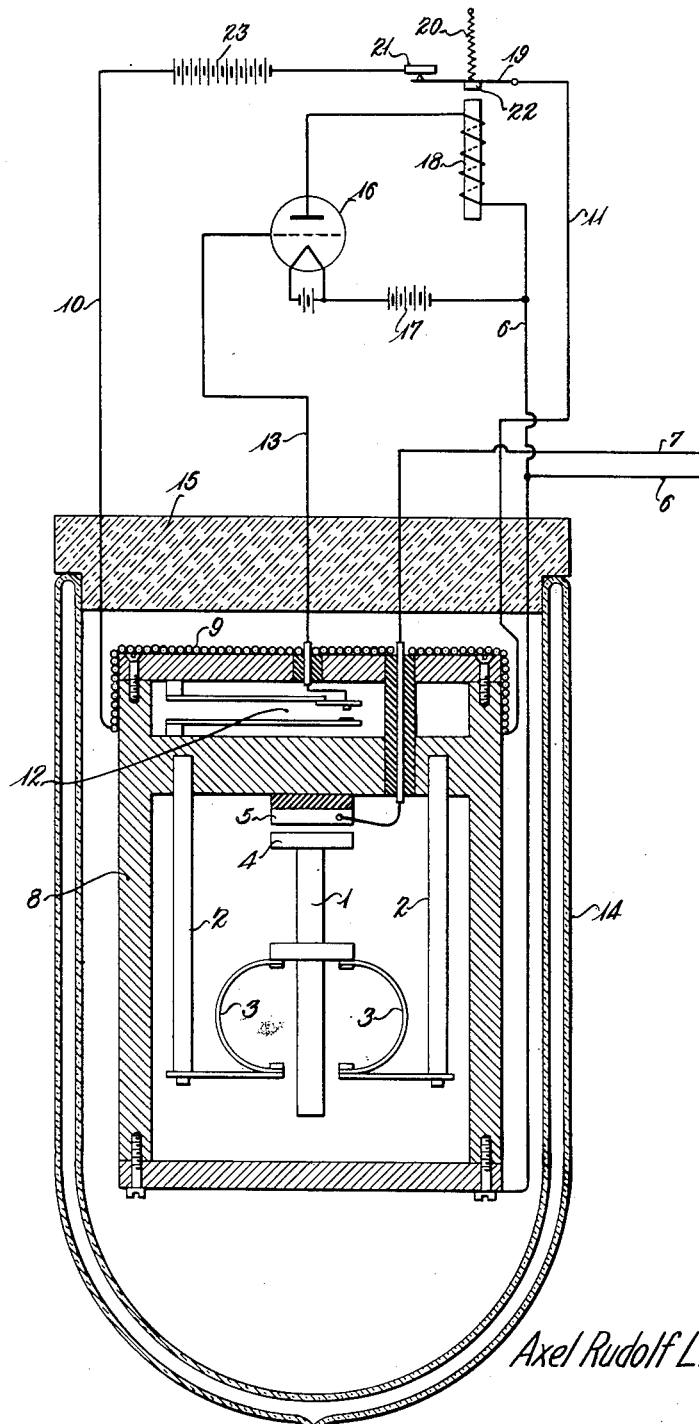
Inventor
Axel Rudolf Lindblad
By Richard K. Stevens
Attorney Patented Nov. 14, 1939

2,179,892

UNITED STATES PATENT OFFICE 2,179,892

APPARATUS FOR DETERMINING GRAVITY

Axel Rudolf Lindblad, Stockholm, Sweden, assignor to Bolidens Gruvaktiebolag, Stockholm, Sweden, a joint-stock company limited of Sweden Application November 24, 1937, Serial No. 176,353
In Sweden September 30, 1937

4 Claims. (Cl. 265—1.4)

The present invention relates to an improved temperature regulation mechanism for determining gravity or changes in the same with the aid of a movable body whose weight has been balanced by means of a spring mechanism, and the invention is characterized essentially thereby that the movable body with its suspension mechanism is altogether encased in a vessel with a large heat capacity and of a material with good heat conductivity, this vessel in its turn being altogether encased in a "Dewar vessel" (thermos flask).

It is generally known to apply heat regulating covers or casings around gravimeters, but none of the designs hitherto used is now satisfactory. For of late years the precision of measuring has been raised to a previously unimagined degree. Instruments with 0.05 mgal ("milligal") precision of measurement can at present be constructed but, in order to enable the sensitiveness of these apparatus to be utilized it is necessary that the sensitiveness of these apparatus can be kept with the utmost precision at the desired level and practically constant. Variations of as little as one hundredth degree or so disturb or spoil the measurement result.

In order to attain the precision now so necessary the mechanism according to the present invention is combined so as to encase altogether the movable parts of the gravimeter in a closed metal vessel with large heat capacity with the arrangement to encase the whole of this apparatus, i. e., the measurement vessel containing the movable parts of the gravimeter in a "Dewar vessel" (thermos flask). Furthermore, it is advisable and suitable, to provide the metal vessel with an electric winding and an automatic temperature regulator.

In order to explain and elucidate the essential and material points of the present invention there is shown on the accompanying drawing an example according to which the apparatus can be suitably arranged.

The movable body 1 is suspended in a stand 2 by means of the two springs 3, so that the body in case of a change of the gravity can move in a vertical direction. The body is at its upper part shaped like a plate 4, which together with an insulated plate 5 fastened in the stand, forms a condenser whose capacity is changed with the changes in the position of the body. The elements 1 to 5 are made from metal. The plate 5 is fastened to the metal body by means of insulating interlining. By measuring the variations of the capacity of the condenser 4, 5 in moving the apparatus from one place to another there is obtained a relative expression of the change in the magnitude of the gravity at the different places of observation. The measuring of the capacity of the condenser can be done with the aid of a capacity gauge suitable for the purpose connected up between the lines 6 and 7, line 6 being connected up with the stand 2, which via the springs 3 is conductively connected with the body 1 and the plate 4, and the line 7, which is connected to the insulated plate 5.

In order to avoid variations in temperature the movable body 1 with the stand 2 is altogether encased in a closed metal vessel 8 with great heat capacity, provided with a heating device made as an electric winding 9 round the upper part of the vessel and through the lines 10 and 11 connected to the battery 23. The electric current in the winding 9 is regulated by the thermoregulator 12, which in the drawing is represented as a bimetal regulator. This regulator is connected by the line 13 with the grid in the electron tube 16. The anode circuit of the latter, which is fed with current from the battery 17, is connected up to the electromagnet 18. Through the contact 19, which is kept pressed by the spring 20 against the plate 21, the current is applied to the heating winding 9 and the vessel 8 is heated. The contact 19 is provided with a projection 22 consisting of iron or nickel. During heating the bimetallic leaves of the thermoregulator approach one another until contact occurs. The grid of the electron tube then receives a positive voltage which amplifies the current in the anode circuit and thereby strengthens the field surrounding the electromagnet to such an extent that the contact 19 is attracted and the current in the heating winding 9 is interrupted.

When cooling has proceeded so far that the thermoregulator circuit is interrupted, the current in the anode circuit again becomes so weak that the spring is able to overcome the magnetic field and to press the contact 19 against the plate 21 so that the current can again flow to the heating winding.

The whole measurement vessel 8 is in its turn placed in a "Dewar vessel" 14, which is closed with a plug 15, made of a heat-insulating material, e. g., cork or fiber mass, with passages for any necessary wires.

Having thus described my invention, I declare that what I claim is:

1. An apparatus for measuring directly the variations in the force of gravity comprising in combination a condenser, means operable by gravimetric force for varying the capacity of said condenser, a closure of heat conducting material for said condenser, an electrical heating coil without but in contact with said closure, and an automatic thermoregulator intimately connected with said closure and adapted to control the current supplied to the electric heating coil to maintain a substantially constant temperature within the closure.

2. An apparatus for measuring directly the variations in the force of gravity comprising in combination a condenser, means operable by gravimetric force for varying the capacity of said condenser, a closure of heat conducting material for said condenser, an electrical heating coil without but in contact with said closure, and an automatic thermoregulator intimately connected with said closure and adapted to control the current supplied to the electric heating coil to maintain a substantially constant temperature within the closure, said automatic thermoregulator comprises bimetal regulator means operating against one another.

3. An apparatus for measuring directly the variations in the force of gravity comprising in combination a condenser, means operable by gravimetric force for varying the capacity of said condenser, a closure of heat conducting material for said condenser, an electrical heating coil without but in contact with said closure, means for controlling the heating current supplied to said coil to maintain a substantially constant temperature within the closure and a "Dewar-vessel" (thermos flask) enclosing the entire apparatus to effect a single unit of which the temperature of the operating elements can be controlled to the accuracy required when measuring small variations in gravimetric force.

4. An apparatus for measuring directly the variations in the force of gravity comprising in combination a condenser, means operable by gravimetric force for varying the capacity of said condenser, a closure of heat conducting material for said condenser, an electrical heating coil without but in contact with said closure, an electric relay to effect the control of the heating current supplied to the electrical heating coil, said relay being regulated by a thermoregulator intimately connected with the inner closure, said thermoregulator operating on the relay by means of an electron tube, whereby the temperature within the closure can be maintained substantially constant.

AXEL RUDOLF LINDBLAD.